United States Patent [19]
Yamamoto et al.

[11] Patent Number: 5,117,480
[45] Date of Patent: May 26, 1992

[54] POLYMER COMPOSITION AND OPTICAL FIBER HAVING CLADDING COMPOSED OF THAT COMPOSITION

[75] Inventors: Takashi Yamamoto, Hiroshima; Tsuruyoshi Matsumoto, Otake; Tadao Kobayashi, Yamaguchi; Katsuhiko Shimada, Otake, all of Japan

[73] Assignee: Mitsubishi Rayon Company Ltd., Tokyo, Japan

[21] Appl. No.: 642,567

[22] Filed: Jan. 18, 1991

Related U.S. Application Data
[63] Continuation of Ser. No. 398,917, Aug. 28, 1989, abandoned.

Foreign Application Priority Data
Aug. 29, 1988 [JP] Japan .................. 63-212339

[51] Int. Cl.$^5$ .............................. G02B 6/02
[52] U.S. Cl. ...................... 385/145; 524/263; 524/185; 524/155; 524/165; 526/247; 526/252; 526/255
[58] Field of Search .......... 350/96.34, 96.29; 526/247

[56] References Cited
U.S. PATENT DOCUMENTS
4,530,569  7/1985  Squire ............... 350/96.34
4,754,009  6/1988  Squire ............... 526/247

FOREIGN PATENT DOCUMENTS
0111343  6/1984  European Pat. Off.

*Primary Examiner*—Joseph L. Schofer
*Assistant Examiner*—Mark D. Sweet
*Attorney, Agent, or Firm*—Oblon, Spivak, McClelland, Maier & Neustadt

[57] ABSTRACT

Disclosed is a polymer composition comprising (I) 60 to 99.8 wt. % of an amorphous copolymer comprising (a) units derived from perfluoro-2,2-dimethyl-1,3-dioxole and (b) units derived from at least one ethylenically unsaturated monomer selected from ethylene, tetrafluoroethylene, chlorotrifluoroethylene, and $CF_2=CFOCF_3$, and (II) 0.2 to 40 wt. % of a compound having a hydrocarbon group containing at least one fluorine atom and at least one functional group selected from —OH, —SR, —COOH, —SO—, —SO$_2$—, —CONH—, —COO—CO—, —CONHCO—, —COO—, —CN, —NCO, —CO—, —HCOO—, —NH$_2$—, —NH—, =N, —SO$_3$H, —NHNH$_2$, —CONH$_2$, —CH=CH$_2$, —CH=CH—, $(RO)_nX_{3-n}Si$—, wherein R is a $C_{1-5}$ alkyl group, n is a number of 0 to 3, and X is halogen or a $C_{1-5}$ alkyl group. The polymer composition is useful for a plastic cladding of an optical fiber.

4 Claims, No Drawings

POLYMER COMPOSITION AND OPTICAL FIBER HAVING CLADDING COMPOSED OF THAT COMPOSITION

This application is a continuation of application Ser. No. 07/398,917, filed on Aug. 28, 1989, now abandoned.

BACKGROUND OF THE INVENTION

1. Field of the Invention

The present invention relates to a fluorine-containing polymer composition and an optical fiber having a cladding composed of the polymer composition.

2. Description of the Related Art

Optical fibers are classified into three types, i.e., a first type composed of a plastic core and a plastic cladding, a second type composed of a glass core and a plastic cladding, and a third type composed of a glass core and a glass cladding. Of these, the first and second types have a good flexibility and are easy to handle, and therefore, are particularly useful for medium- or short-distance information communication and display.

The physical properties demanded for the cladding material of optical fibers are a low refractive index, a good transparency and heat resistance, an increased adhesion to the core material, and a high mechanical strength, and so on. Japanese Examined Patent Publication No. 53-21660 specification describes an optical fiber having a cladding formed of a copolymer of vinylidene fluoride with tetrafluoroethylene. Although the vinylidene fluoride copolymer shows a satisfactory adhesion to, e.g, a methacrylate resin, and an excellent processability, it has a problem in that since this copolymer is so essentially crystalline that it is easily crystallized by heating or cooling, to grow spherulites, and the light passing through the core is scattered by the spherulites of the cladding, thus resulting in a lowering of the light transmission properties. On the other hand, a polymer composed primarily of a fluorinated alkyl methacrylate as disclosed in e.g., Japanese Examined Patent Publication No. 56-8321, is so essentially amorphous that although it retains a satisfactory transparency when used as the cladding material of optical fibers, it has problems in that the adhesion to the core, and the processability and heat resistance, are unsatisfactory.

SUMMARY OF THE INVENTION

The primary object of the present invention is to provide a polymer composition which is useful as a cladding material for an optical fiber having a good resistance to the environment, such as a heat resistance and thermal decomposition resistance, an enhanced processability, and a satisfactory flexibility.

In accordance with one aspect of the present invention, there is provided a polymer composition comprising (I) 60 to 99.8% by weight, based on the weight of the polymer composition, of an amorphous copolymer comprising (a) units derived from perfluoro-2,2-dimethyl-1,3-dioxole and (b) units derived from at least one ethylenically unsaturated monomer selected from the group consisting of ethylene, tetrafluoroethylene, chlorotrifluoroethylene, and a compound represented by the formula $CF_2=CFOCF_3$, and (II) 0.2 to 40% by weight based on the weight of the polymer composition, of a compound having a hydrocarbon group containing at least one fluorine atom, and at least one functional group selected from the group consisting of —OH, —SR, —COOH, —SO—, —SO$_2$—, —CONH—, —COO—CO—, —CONHCO—, —COO—, —CN, —NCO, —CO—, HCOO—, —NH$_2$, —NH—, =N, —SO$_3$H, —NHNH$_2$, —CONH$_2$, —CH=CH$_2$, —CH=CH—, $(RO)_nX_{3-n}Si$—, wherein R represents an alkyl group having 1 to 5 carbon atoms, n is a number of 0 to 3, and X is a halogen atom or an alkyl group having 1 to 5 carbon atoms.

In another aspect of the present invention, there is provided an optical fiber having a light-transmitting core and a cladding composed of the above-mentioned polymer composition.

DESCRIPTION OF THE PREFERRED EMBODIMENTS

The copolymer (I) of perfluoro-2,2-dimethyl-1,3-dioxole with at least one ethylenically unsaturated monomer is prepared by the methods disclosed in, for example, U.S. Pat. No. 3,978,030 and Japanese Unexamined Patent Publication No. 58-38707. The ethylenically unsaturated monomer includes ethylene, tetrafluoroethylene, chlorotrifluoroethylene, and a compound represented by the formula $CF_2=CFOCF_3$. The copolymerization ratio of perfluoro-2,2-dimethyl-1,3-dioxole to the ethylenically unsaturated monomer is preferably from 10/90 to 80/20 by mole.

The copolymer (I) possesses a satisfactory heat resistance, attributed to the ring structure of perfluoro-2,2-dimethyl-1,3-dioxole, and shows a high glass transition temperature. When the copolymer (I) is used alone as the cladding material for an optical fiber, however, it exhibits a poor adhesion to transparent polymers used as the core material, for example, a methacrylate resin and polycarbonate, or transparent glass such as multi-component glass and quartz glass, and is poor in the flexural properties required for optical fibers. However, the addition of the compound (II) to the compound (I) introduces remarkable improvements in the adhesion to the core material and the flexural properties.

The compound (II) having in its molecule a fluorinated hydrocarbon residue containing at least one fluorine atom, and a functional group has in its structure a fluorinated hydrocarbon residue which is obtained by partial or whole substitution by a fluorine atom or atoms of the hydrogen atoms of an aliphatic hydrocarbon residue such as a methyl, ethyl or propyl group, an alicyclic hydrocarbon residue such as a cyclobutyl, cyclopentyl or cyclohexyl group or an aromatic hydrocarbon residue, and also has a functional group such as a hydroxyl, mercapto, carboxy, sulfino, sulfo, sulfonyl, amide, hydrazyl, —CO—NH—, —COO—CO—, CO—NH—CO—, —COO—, cyano, isocyanate, carbonyl, formyl, amino, imino, nitrilo or active silyl group; or an ethylenically unsaturation.

Particular preference is given to the following compounds (II): $C_6F_{13}CH_2CH_2OH$, $C_9F_{19}CH_2OH$, $C_{10}F_{21}CH_2CH_2OH$, $HOCH_2(CF_2)_3CH_2OH$, $C_6F_{13}COOH$, $C_9F_{19}COOH$, $C_8F_{17}CH_2CH_2COOH$, $HOOC(CF_2)_4COOH$, $(C_7F_{15}CO)_2O$, $C_8F_{17}SO_2NHCH_2CH_3$, $C_8F_{17}SO_2N(C_2H_5)CH_2CH_2OH$, $C_8F_{17}SO_3H$, $C_6F_{13}CH_2CH_2SO_3H$, $C_6F_{13}SH$, $C_8F_{17}NCO$, $C_8F_{17}COOC_2H_5$, $C_3F_7OCF(CF_3)COOCH_3$, $C_3F_7O[CF(CF_3)CF_2O]CF(CF_3)COOCH_3$, $CF_7O[CF(CF_3)CF_2O]CF(CF_3)COOCH_3$, $(C_5F_{11})_3N$, $C_7H_{15}CH_2NH_2$, $C_7F_{15}CONH_2$, $C_6F_5NHNH_2$, $C_6F_5SH$, $C_6F_5COCH_3$, $H_2NCOCF_2CF_2CONH_2$, $CF_3CH_2CH_2Si(OCH_3)_3$, and $C_8F_{17}CH_2CH_2Si(OCH_3)_3$.

The amount of the compound (II) to be added is 0.2 to 40% by weight, preferably 0.5 to 5% by weight based on the total weight of the copolymer (I) and the compound (II).

The core material for optical fibers used in association with the cladding material composition according to the present invention may be transparent inorganic materials such as multi-component glass and quartz glass, and transparent organic polymeric materials such as methyl methacrylate polymers, styrene polymers, resins, polycarbonate, poly-4-methypentene-1, and deuterated polymethyl methacrylate and polystyrene. Of the transparent organic polymeric materials, the methyl methacrylate polymers such as polymethyl methacrylate, a copolymer containing at least 70% by weight of methyl methacrylate units, and deuterated resins of polymethyl methacrylate or the methyl methacrylate copolymer are preferable in view of the light transmission properties. The comonomers to be copolymerized with methyl methacrylate includes, for instance, acrylates such as methyl acrylate, ethyl acrylate, propyl acrylate, butyl acrylate and 2-ethylhexyl acrylate and methacrylates such as cyclohexyl methacrylate, benzyl methacrylate, ethyl methacrylate, propyl methacrylate and butyl methacrylate. Preferable methyl methacrylate polymers are prepared by a continuous bulk polymerization method such as, for example, disclosed in Japanese Examined Patent Publication No. 53-42260. A methyl methacrylate polymer consisting of 2% by weight or more of a ring structure unit expressed by the following formula:

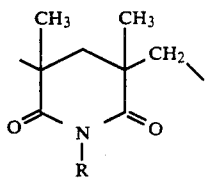

wherein R represents an alkyl or cycloalkyl group, and 98% by weight of a monomer unit predominantly composed of methyl methacrylate is also preferable.

In the preparation of optical fibers, the cladding material composition of the present invention may be dissolved in a solvent, preferably in a fluorine-containing solvent, and the core material then immersed in the resulting solution to coat the core material's surface with the cladding material composition. Alternatively, the core component polymer may be coextruded with the cladding component by the use of a core-sheath type composite spinning nozzle. The thus obtained optical fibers may be provided with an outer protecting or covering layer formed of an organic polymer, if desired, and may be used as parts for optical fiber core wires, optical fiber cords, optical fiber cables, etc. in combination with, for example, tension members such as polyester fibers, polyamide fibers, metal fibers, and carbon fibers.

The cladding material compositions of the present invention have a satisfactory heat resistance, thermal decomposition resistance, and adhesion to the associated core materials, and the optical fibers having a cladding composed of the compositions exhibit an enhanced resistance to environment and a high reliability.

The invention will be specifically described by the following examples.

EXAMPLE 1

Added to 100 parts by weight of a copolymer consisting of 68 mol % of perfluoro-2,2-dimethyl-1,3-dioxole and 32 mol % of tetrafluoroethylene were 2 parts by weight of 3,3,3-trifluoropropyltrimethoxysilane, and the resulting product was dissolved in perfluoro(2-butyltetrahydrofuran) (Florinate FC-75 manufactured by 3M Co., Ltd.) to prepare a solution having a solid concentration of 25% by weight. This solution was coated onto the surface of a quartz glass fiber of 200 μm in diameter, which was then passed through a hot air furnace maintained at 100° C., to thereby obtain a core-cladding type of optical fiber having an outer diameter of 250 μm.

This optical fiber showed a light attenuation of 10.5 dB/km at 850 nm (NA=0.25). Under no load, the optical fiber was wound for one turn around a column to determine a minimum permissible diameter of a column around which the optical fiber could be wound without fracture. As a result, it was found that such a winding could be made even around a column 4 mm in diameter. After being retained in a constant temperature bath of 150° C. for 4,000 hours, an increase in the light attenuation was smaller than 1 dB/km.

EXAMPLE 2

An optical fiber was obtained in the way as described in Example 1, provided that 1.5 parts by weight of methyl perfluoro-2,5,8-trimethyl-3,6,9-trioxadodecanoate $C_3F_7O[CF(CF_3)CF_2O]_2CF(CF_3)COOCH_3$ was added in place of 3,3,3-trifluoropropyltrimethoxysilane. The minimum permissible diameter of a column around which the optical fiber could be wound was 4 mm.

COMPARATIVE EXAMPLE 1

An optical fiber was obtained in the same manner as described in Example 1, except that a polymer solution was prepared without using 3,3,3-trifluoropropyltrimethoxysilane. The minimum permissible diameter of a column around which the optical fiber could be wound was 10 mm, and the fiber was fractured by winding around column having a smaller diameter.

EXAMPLE 3

To 100 parts by weight of a copolymer consisting of 82 mol % of perfluoro-2,2-dimethyl-1,3dioxole and 18 mol % of vinylidene fluoride were added 1.5 parts by weight of perfluorocapric acid, and the resulting product was dissolved in perfluoro(2-butyltetrahydrofuran) to prepare a solution having a solid concentration of 20% by weight. This solution was coated onto the surface of a polycarbonate core fiber of 970 μm in diameter, which was then passed through a hot air furnace maintained at 100° C., to thereby obtained an optical fiber having a diameter of 1,000 μm.

This optical fiber showed a light attenuation of 870 dB/km at 770 nm. The optical fiber was subjected to repeated flexing testing in which it was sandwiched between two parallel columns having a diameter of 10 mm in a manner such that the axis of the fiber was perpendicular to the axes of the columns, and the fiber was flexed repeatedly through 180° on either side in a plane perpendicular to the axes of the columns. After this testing had been repeated 5,000 times, an increase in the light attenuation was smaller than 50 dB/km. After being retained in a constant temperature bath of 125° C. for 2,000 hours, an increase in the light attenuation was smaller than 100 dB/km, and thus, the optical fibers exhibited a satisfactory heat resistance.

We claim:

1. An optical fiber having a light transmitting core and a plastic cladding which is composed of a polymer composition consisting of (I) 60 to 99.8% by weight, based on the weight of the polymer composition of an amorphous copolymer comprising (a) units derived from perfluoro-2,2-dimethyl-1,3-dioxole and (b) units derived from at least one ethylenically unsaturated monomer selected from the group consisting of ethylene, tetrafluoroethylene, chlorotrifluoroethylene and a compound represented by the formula $CF_2=CFOCF_3$, and (II) 0.2 to 40% by weight, based on the weight of the polymer composition, of an aliphatic hydrocarbon compound, an alicyclic hydrocarbon compound or an aromatic hydrocarbon compound substituted by at least one fluorine atom and a functional group selected from the group consisting of —OH, —SR, —COOH, —SO—, —SO$_2$—, —CONH—, —COO—CO—, —CONHCO—, —COO—, —CN, —NCO, —CO—, HCOO—, —NH$_2$, —NH—, =C=NH, —SO$_3$H, —NHNH$_2$, —CONH$_2$, and $(RO)_nX_{3-n}Si$—, wherein R is an alkyl group of 1 to 5 carbon atoms, n is 0 or an integer of 1 to 3, and X is a halogen atom or an alkyl group of 1 to 5 carbon atoms.

2. An optical fiber according to claim 1, wherein the amount of the compound having a fluorine atom-containing hydrocarbon group and at least one functional group is from 0.5 to 5% by weight based on the weight of the polymer composition.

3. An optical fiber according to claim 1, wherein the amorphous copolymer (I) comprises (a) 10 to 30% by mole of units derived from perfluoro-2,2-dimethyl-1,3-dioxole and (b) 90 to 20% by mole of units derived from at least one ethylenically unsaturated monomer selected from the group consisting of ethylene, tetrafluoroethylene, chlorotrifluoroethylene and $CF_2=CFOCF_3$.

4. An optical fiber according to claim 1, wherein said compound of Formula (II) is: $C_6F_{13}CH_2CH_2OH$, $C_9F_{19}CH_2OH$, $C_{10}F_{21}CH_2CH_2OH$, $HOCH_2(CF_2)_3CH_2OH$, $C_6F_{13}COOH$, $C_9F_{19}COOH$, $C_8H_{17}CH_2CH_2COOH$, $HOOC(CF_2)_4COOH$, $(C_7F_{15}CO)_2O$, $C_8F_{17}SO_2NHCH_2CH_3$, $C_8F_{17}SO_2N(C_2H_5)CH_2CH_2OH$, $C_8F_{17}SO_3H$, $C_6F_{13}CH_2CH_2SO_3H$, $C_6F_{13}SH$, $C_8F_{17}NCO$, $C_8F_{17}COOC_2H_5$, $C_3F_7OCF(CF_3)COOCH_3$, $C_3F_7O[CF(CF_3)CF_2O]CF(CF_3)COOCH_3$, $CF_7O[CF(CF_3)CF_2O]CF(CF_3)COOCH_3$, $(C_5F_{11})_3N$, $C_7H_{15}CH_2NH_2$, $C_7F_{15}CONH_2$, $C_6F_5NHNH_2$, $C_6F_5SH$, $C_6F_5COCH_3$, $H_2NCOCF_2CF_2CONH_2$, $CF_3CH_2CH_2Si(OCH_3)_3$, or $C_8F_{17}CH_2CH_2Si(OCH_3)_3$.

* * * * *